US012761102B2

(12) United States Patent
Hoorfar et al.

(10) Patent No.: US 12,761,102 B2
(45) Date of Patent: Oct. 13, 2026

(54) APPARATUS, SYSTEMS, AND METHODS FOR HYDROCARBON GAS DETECTION AND DIFFERENTIATION

(71) Applicant: THE UNIVERSITY OF BRITISH COLUMBIA, Vancouver (CA)

(72) Inventors: Mina Hoorfar, Victoria (CA); Homayoun Najjaran, Kelowna (CA); Allen Gerard O'Brien, Kelowna (CA); Nishat Tasnim, Kelowna (CA); Mohamed Tarek Aly, Kelowna (CA); Matthew Barriault, Kelowna (CA); Adithya Ravishankara, Kelowna (CA); Isaac Judson Alexander, Rocky View County (CA); Emily Elizabeth Earl, Kelowna (CA); George Ng, Kelowna (CA)

(73) Assignee: THE UNIVERSITY OF BRITISH COLUMBIA (CA)

( * ) Notice: Subject to any disclaimer, the term of this patent is extended or adjusted under 35 U.S.C. 154(b) by 352 days.

(21) Appl. No.: 18/021,161

(22) PCT Filed: Aug. 13, 2021

(86) PCT No.: PCT/CA2021/051116
§ 371 (c)(1),
(2) Date: Feb. 13, 2023

(87) PCT Pub. No.: WO2022/032393
PCT Pub. Date: Feb. 17, 2022

(65) Prior Publication Data

US 2023/0228644 A1 Jul. 20, 2023

Related U.S. Application Data

(60) Provisional application No. 63/065,123, filed on Aug. 13, 2020.

(51) Int. Cl.
*G01M 3/18* (2006.01)

(52) U.S. Cl.
CPC .................................... *G01M 3/18* (2013.01)

(58) Field of Classification Search
CPC ............... G01M 3/18; G01M 33/0047; G01M 33/225; G01M 33/0006; G01N 27/12
See application file for complete search history.

(56) References Cited

U.S. PATENT DOCUMENTS

| | | | | |
|---|---|---|---|---|
| 4,736,617 A * | 4/1988 | Huhmer | G01N 33/0009 | 73/23.2 |
| 5,832,411 A * | 11/1998 | Schatzmann | G01N 33/0075 | 702/30 |

(Continued)

FOREIGN PATENT DOCUMENTS

| | | | | |
|---|---|---|---|---|
| BR | 112019011183 A2 * | 12/2019 | F16K 1/443 |
| CA | 2947079 A1 | 5/2018 | |
| JP | 6654171 B2 * | 2/2020 | F17C 1/00 |

OTHER PUBLICATIONS

BR-112019011183-A2 (Year: 2017).*
JP-6654171-B2 (Year: 2020).*

(Continued)

*Primary Examiner* — Fatemeh Esfandiari Nia
(74) *Attorney, Agent, or Firm* — Billion & Armitage

(57) ABSTRACT

Embodiments of the present disclosure relate to apparatus, systems, and methods for detection and differentiation of selected hydrocarbon gases in a target gas composition. The apparatus comprises a sensing unit; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and (Continued)

comprising at least one chamber and a closure member housed within the second housing portion and adjacent the inlet, the closure member actuatable between a closed state and an open state by the linear actuator; wherein the at least one chamber is in fluid communication with the inlet when the closure member is in the open state.

21 Claims, 7 Drawing Sheets

(56) References Cited

U.S. PATENT DOCUMENTS

2016/0101278 A1* 4/2016 Norris .................. A61M 39/22
604/29
2021/0268615 A1* 9/2021 Morton .................. B65G 47/92

OTHER PUBLICATIONS

Paknahad, et al., “A Microfluidic Gas Analyzer for Selective Dete4ction of Biomarker Gases”, 2012 IEEE Sensors Applications Symposium Proceedings, 2012, pp. 1 to 5.
Montazeri, et al., “A sensor for nuisance sewer gas monitoring”, 2017 IEEE Sensors, 2017, pp. 1-3.
Boyd-Moss, et al., “Self-contained microfluidic systems: A review”, Lab Chip. 16 (2016) 3177-3192.
Montazeri, et al., “A sensor for nuisance sewer gas monitoring”, 2017 IEEE Sensors. (2017) 1-3.
Paknahad, et al., “A microfluidic gas analyzer for selective detection of biomarker gases”, 2012 IEEE Sensors Appl. Symp., 2012: pp. 1-5.
Paknahad, et al., “Characterization of channel coating and dimensions ofmicrofluidic-based gas detectors”, Sensors Actuators, B Chem. 241 (2017) 55-64.
Paknahad, et al., “On-Chip Electronic Nose For Wine Tasting: A Digital Microfluidic Approach”, IEEE Sens. J. 17 (2017) 4322-4329.

* cited by examiner

APPARATUS, SYSTEMS, AND METHODS FOR HYDROCARBON GAS DETECTION AND DIFFERENTIATION

CROSS-REFERENCE TO RELATED APPLICATIONS

This application claims priority to and benefit of U.S. Provisional Patent Application Ser. No. 63/065,123 filed on Aug. 13, 2020, which is incorporated by reference in its entirety.

FIELD OF THE DISCLOSURE

The present disclosure relates to apparatus, systems, and methods for hydrocarbon gas detection and differentiation. In particular aspects, the present disclosure relates to the detection of leaks in natural gas pipelines and differentiation of leaked hydrocarbon gases.

BACKGROUND

Natural gas is an essential resource in today's world. In the United States, for example, natural gas provides 29% of the total energy supply, and 33% of electricity generation [1]. Much of this natural gas is used for residential and commercial heating, and must be transported great distances to homes and businesses all over the country. To achieve this, a vast network of pipelines is used, any of which are potential sources of leaks. Actual leakage rates from these pipelines can be difficult to quantify but most sources assume a rate of 1% to 4%, and in 1992 natural gas leakage amounted to over 5.5 billion cubic meters of methane emissions [2]. Due to the environmental impact of methane as a greenhouse gas, it is necessary to detect and minimize these fugitive emissions in order for the natural gas to be used as a cleaner alternative to fossil fuels.

Natural gas pipeline leak-detection methods can be broadly categorized into "internal" and "external" methods, depending on whether the detector resides inside or outside the pipeline. Internal methods include acoustic measurement, pressure/flow monitoring, and statistical analysis. These methods often use mathematical modeling options to predict when a leak has occurred. External methods are typically hardware-based relying on, for example, acoustic, optical, soil monitoring, or vapor sampling sensors. Hardware solutions may either be permanently installed in a fixed location or alternatively, used in conjunction with a mobile monitoring apparatus such as a handheld detector or an unmanned aerial vehicle (UAV) [3].

Of particular interest are methods that support inexpensive and portable sensing devices that restricts the scope of candidate technologies to those classified as "external" methods. Acoustic instruments have been integrated into portable devices, pipeline pigs [3], and permanent installations affixed outside pipelines [4]. However, acoustic-type sensors are vulnerable to background acoustic noise that can overpower a leak signal. Similar to acoustic methods, optical methods offer portability and flexibility due to the number of available technologies including LIDAR, diode laser absorption, backscatter imaging, and thermal imaging. One of the greatest benefits of an optical system is the ability to sense leaks remotely [5], but many of the available technologies are quite expensive [3]. Vapor sampling is another available method for portable detection that can be a smaller and less expensive alternative to acoustic or optical due to the advantages of the various types of sensing elements (metal oxide semiconductor, catalytic bead, electrochemical, and the like). This makes it especially attractive for applications using portable systems like UAVs [6].

Regardless of the sensing method, discriminating between natural gas leaks and background methane (e.g., emissions from agriculture and landfills) is challenging. The composition of natural gas is highly variable at the point of extraction, with the methane proportion varying from ~30% to over 95%. Even after processing, typical standards only require a minimum methane mole fraction of 75%, with up to 10% ethane allowed [7]. The difference in the effects of such similar hydrocarbon gases on a sensor's response may not be immediately clear, especially with non-selective sensors such as many of the inexpensive ones found in vapor-sampling devices. In much of the described leak detection literature, this issue is not discussed, but several patents have addressed it using infrared absorption [8][9]. This approach has the potential for a compact solution to the selectivity problem, but it is difficult to extend the functionality. This is because infrared absorption is a narrow-band technique and therefore, detection of new gases would require the addition of extra sensors that are specifically selective to them.

An "electronic nose" or "E-nose" is a common type of vapor-sampling device to identify odors by mimicking human olfaction [10]. E-noses have a wide variety of implementations and sensor types which have been deployed in diverse industries such as agriculture, food and beverage, manufacturing, and military [11]. Single metal oxide semiconducting (MOS) type sensors are a common choice for E-nose arrays. They operate based on resistance chances from gas adsorption on their sensing surfaces [12]. Despite advantages such as high sensitivity, low cost, and small form factors, they typically suffer from poor selectivity [13]. This shortcoming makes it necessary to combine multiple MOS sensors and pattern-recognition algorithms to perform discriminative predictions [14].

SUMMARY

A need exists for improving the detection and differentiation of hydrocarbon gases. In particular, a need exists for apparatus, systems, and methods for accurately discriminating between natural gas leaks and background methane so that leaks from natural gas pipelines may be quickly detected and fugitive emissions minimized The present disclosure relates to apparatus, systems, and methods for hydrocarbon gas detection and differentiation.

In some embodiments, the present disclosure relates to an apparatus for detection and differentiation of hydrocarbon gas leaks wherein the apparatus comprises: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator; wherein the at least one chamber is in fluid communication with the inlet when the closure member is in the open state.

In some embodiments, the present disclosure relates to a system for detection and differentiation of hydrocarbon gases, the system comprising: an apparatus for hydrocarbon gas detection and differentiation, the apparatus comprising: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator; wherein the at least one chamber is in fluid communication with the inlet when the closure member is in the open state; a processor for data collection; and a power source.

In some embodiments, the present disclosure relates to a method of detection and differentiation of hydrocarbon gases, the method comprising: providing hydrocarbon gases an access to a chamber of an apparatus for hydrocarbon gas detection and differentiation, the apparatus comprising: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator; collecting baseline data with the closure member in a closed state of a first time interval; actuating the linear actuator to an extended state thereby exposing the channel to the hydrocarbon gas for a second time interval; collecting exposure data during the second time interval; and processing the baseline data and the exposure data. In some embodiments, the step of processing (i) provides a baseline output and an exposure output for analyses and comparisons thereof, and a summary report for the analyses and comparisons, (ii) determines if there are significant differences between the baseline output and the exposure output and if significant differences are identified, (iii) produces a summary report for the determination, and communicates an alert and the summary report of the identified significant differences to a recipient.

Other aspects and embodiments of the present disclosure are evident in view of the detailed description provided herein.

BRIEF DESCRIPTION OF THE DRAWINGS

These and other features of the invention will become more apparent from the following description in which reference is made to the appended drawings. The appended drawings illustrate one or more embodiments of the present disclosure by way of example only and are not to be construed as limiting the scope of the present disclosure.

FIG. 5 illustrates three phases of data collection for a given sample of a binary mixture according to a method of the present disclosure wherein

FIG. 7 shows a series of data plots according to Example 5, wherein

DETAILED DESCRIPTION

Unless otherwise defined, all technical and scientific terms used herein generally have the same meaning as commonly understood by one of ordinary skill in the art to which this disclosure pertains.

The present disclosure relates to apparatus, systems, and methods for detection and differentiation of gaseous leaks that comprise hydrocarbons. As used herein, the term "detection" and its similar terms is intended to refer to an indication of the presence of one or more hydrocarbon gases. The term "differentiation" and its related terms is intended to refer to identifying and/or distinguishing one or more hydrocarbon gases from a gaseous mixture. As used herein, the expression "hydrocarbon gases" is intended to refer to organic compounds comprising carbon and hydrogen that at ambient temperatures and ambient pressures are in a gaseous state. Examples of hydrocarbon gases include methane ($CH_4$), ethane ($C_2H_6$), propane ($C_3H_8$), butanes ($C_4H_{10}$), pentanes ($C_5H_{12}$), hexane ($C_6H_{14}$), and heptane ($C_7H_{16}$). The hydrocarbon gas being detected and differentiated may be a component of a binary mixture of hydrocarbon gases, a component of a mixture of three or more hydrocarbon gases, or a component of a mixture of gases comprising hydrocarbon gases and/or non-hydrocarbon gases such as, for example, $N_2$, $H_2$, $CO_2$, and the like. In a particular embodiment, the hydrocarbon gas to be detected and differentiated is ethane in natural gas. Without being bound by any particular theory, differentiation of ethane in natural gas may be used to discriminate natural gas pipeline leaks from background methane emissions.

In some embodiments, the present disclosure provides an apparatus for detection and differentiation of hydrocarbon gases, the apparatus comprising: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator; wherein the at least one chamber is in fluid communication with the inlet when the closure member is in the open state.

Figure 1:
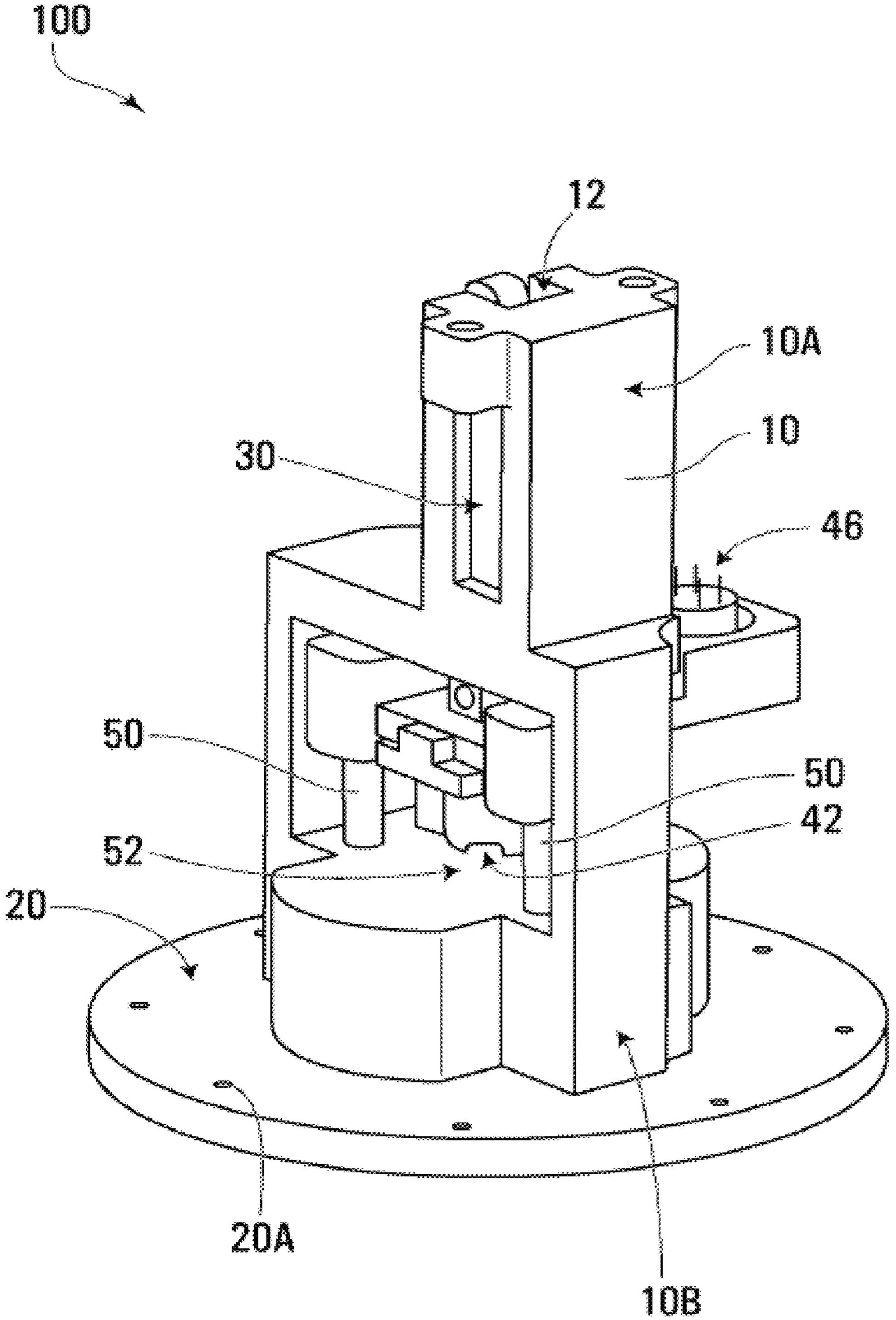
FIG. 1 shows an example of an apparatus according to some embodiments of the present disclosure.

FIG. 1 illustrates an exemplary embodiment of an apparatus 100 according to the present disclosure. The apparatus 100 comprises a housing 10 and a mounting flange 20. As used herein, the term "housing" refers to a structure that encloses and retains therein at least a portion of or all of a specified component. The housing 10 comprises a first housing portion 10A and a second housing portion 10B. In some embodiments, the second housing portion 10B may be fixedly attached to the mounting flange 20 at an end distal the first housing portion 10A. The mounting flange 20 may operatively couple the apparatus 100 to a gas-containing system at the end of the second housing 10B portion distal to the first housing portion 10A. In some embodiments, the gas-containing system is a natural gas pipeline. In some embodiments, the gas-containing system is a laboratory gas-containing system. The mounting flange 20 may comprise two or more mounting apertures 20A for operatively coupling the apparatus 100 to the gas-containing system. The mounting flange 20 may be of any suitable shape and material, such as the housing 10 materials described elsewhere herein. In some embodiments, the mounting flange 20 is of a circular shape.

In some embodiments, the housing 10 is a monolithic structure formed from the same piece of material. In some embodiments, the first housing portion 10A and the second housing portion 10B are formed as separate and distinct pieces that are operatively coupleable to form the housing 10.

The housing 10 may be made of any suitable material. In some embodiments, the housing 10 may be a metal or a metallic alloy. In an embodiment, the housing 10 is made of steel. The steel may be a conventional steel or a high-tensile steel. In some embodiments, the housing 10 may be a plastic, a polymer, or a polymer blend. In a particular embodiment, the housing 10 is made of grade 1 aluminum, grade 2 aluminum, cast iron with machined sliding surfaces, or a rigid plastic such as, but not limited to, RGD810™ and Accura™ ClearVue. In an embodiment, the first housing portion 10A and the second housing portion 10B are of the same material. In an embodiment, the first housing portion 10A and the second housing portion 10B are of different materials.

The housing 10 may be of any suitable shape and size to accommodate other components of the apparatus described later herein. In an embodiment, the first housing portion 10A may have the same shape as the second housing portion 10B. In an embodiment, the first housing portion 10A may have a different shape than the second housing portion 10B. In a particular embodiment, the first housing portion 10A is of a smaller size than the second housing portion 10B.

The first housing portion 10A is configured to receive a linear actuator 30 therewithin. As used herein, the expression "configured to receive a linear actuator therewithin" means that the structure of the first housing portion 10A allows for at least a portion of the linear actuator 30 to be housed and/or enclosed and/or retained within the first housing portion 10A. In some embodiments, the linear actuator 30 is at least partially housed within the first housing portion 10A. In some embodiments, the linear actuator 30 is substantially housed within the first housing portion 10A. In some embodiments, the linear actuator 30 may be received within an actuator cavity 12 of the first housing portion 10A. The linear actuator 30 may be any suitable linear actuator such as, for example, an Actuonix PQ12, r series with or without position feedback.

In some embodiments of the present disclosure, the linear actuator 30 is operatively coupleable to a sensing unit 40 proximal to an inlet 42 of the sensing unit 40. In some embodiments, the sensing unit 40 is positioned substantially perpendicular to the housing 10 when in an operative state. The sensing unit 40 may be any unit suitable for detection and differentiation of hydrocarbon gases.

Figure 2:
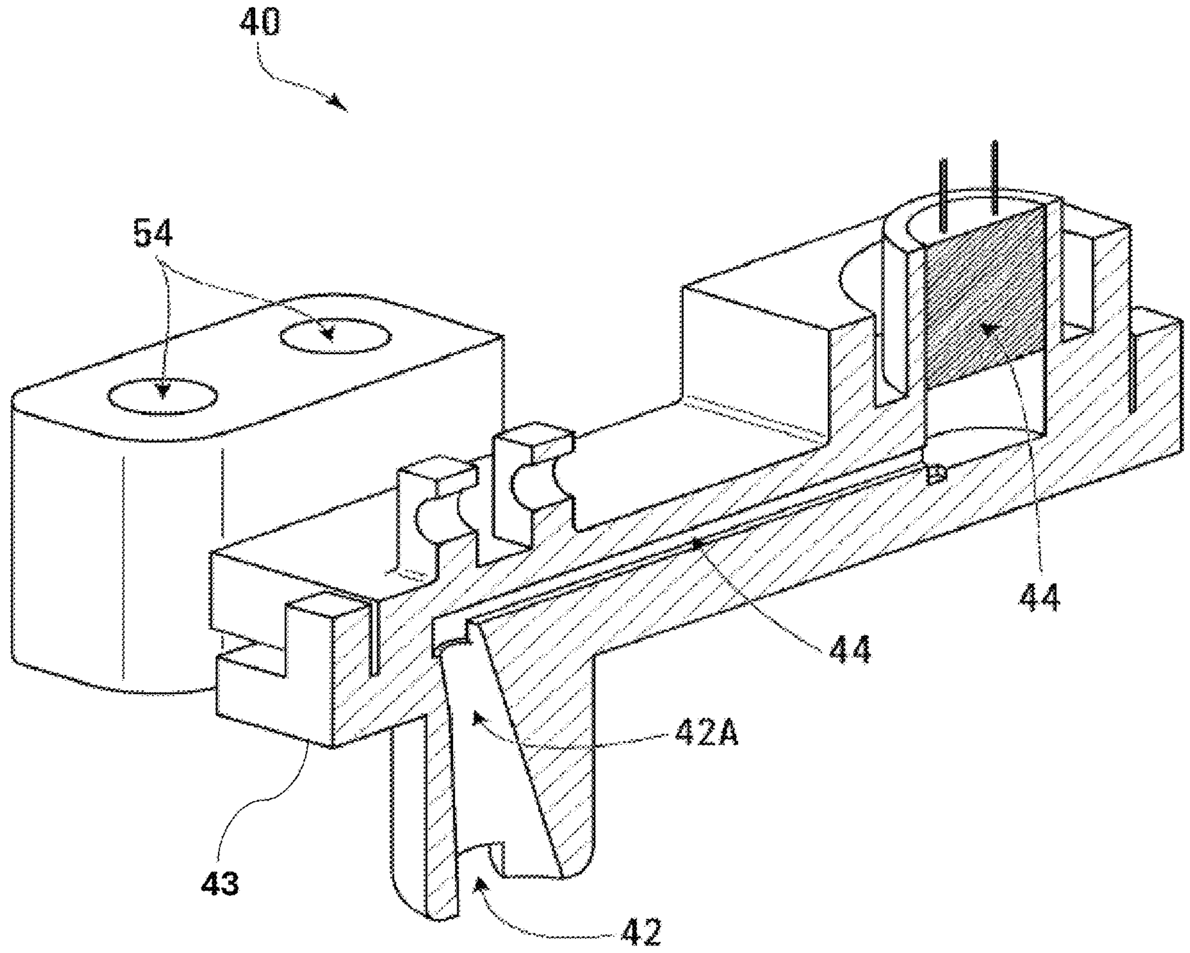
FIG. 2 shows a cross-sectional view of a sensing unit according to some embodiments of the present disclosure.

FIG. 2 shows a cross-section of an exemplary sensing unit 40 according to some embodiments of the present disclosure. The sensing unit 40 may comprise the inlet 42 at an inlet end 43, a channel 44 in fluid communication with the inlet 42, and a sensor 46 in fluid communication with the channel 44, the sensor 46 at an end of the channel 44 opposite the inlet end 43. In some embodiments, the inlet 42 may comprise an inlet conduit 42A. The inlet conduit 42A may be of uniform dimeter from the inlet 42 to the channel 44, or not. In an embodiment, the inlet conduit 42A may taper from the inlet 42 to the channel 44. In some embodiments, the inlet conduit 42A has a frustoconical shape. In some embodiments, the channel 44 is a microchannel As used herein, the term "microchannel" is intended to refer to a channel having at least one dimension that is about 1 mm or smaller. In a particular embodiment, the channel 44 may be a 3D-printed microchannel.

Without being bound by any particular theory, a target gas or gaseous mixture introduced at the inlet 42 may diffuse through the channel 44 before reaching the sensor 46, which may provide selectivity based on the diffusion rates of different gases. The channel 44 may be of any suitable size. Optimization of parameters such as the channel dimensions and coatings was previously performed [15] to maximize selectivity between methanol, ethanol, and acetone.

In some embodiments, the channel 44 may have a length of between about 20 mm and about 40 mm. In some embodiments, the channel 44 may have a length of 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, or 40 mm.

In some embodiments, the channel 44 may have a width between about 1 mm and about 10 mm. In some embodiments, the channel 44 may have a width of 1 mm, 2 mm, 3 mm, 4 mm, 5 mm, 6 mm, 7 mm, 8 mm, 9 mm, or 10 mm.

In some embodiments, the channel 44 may have a height of between about 200 gm and about 1 mm. In some embodiments the channel 44 may have a height of between about 100 gm and about 1 mm. In a particular embodiment, the channel 44 may have a length of about 30 mm, a width of about 3 mm, and height of about 1 mm. In some embodiments of the present disclosure, the channel 44 may be 3D-printed.

The sensor 46 may be any suitable sensor. In some embodiments of the present disclosure, the sensor 46 is a metal oxide semiconductor (MOS) such as, but not limited to, a tin oxide-based chemo-resistive gas sensor. In some embodiments, the sensor 46 may be an infrared sensor. In a particular embodiment, the sensor 46 is a Figaro TGS2610 metal oxide semiconducting gas sensor. In some embodiments, the sensing unit 40 comprises more than one sensor 46 in the channel 44. In a particular embodiment, sensor 46 is embedded at the end of a channel 44.

Figure 4:
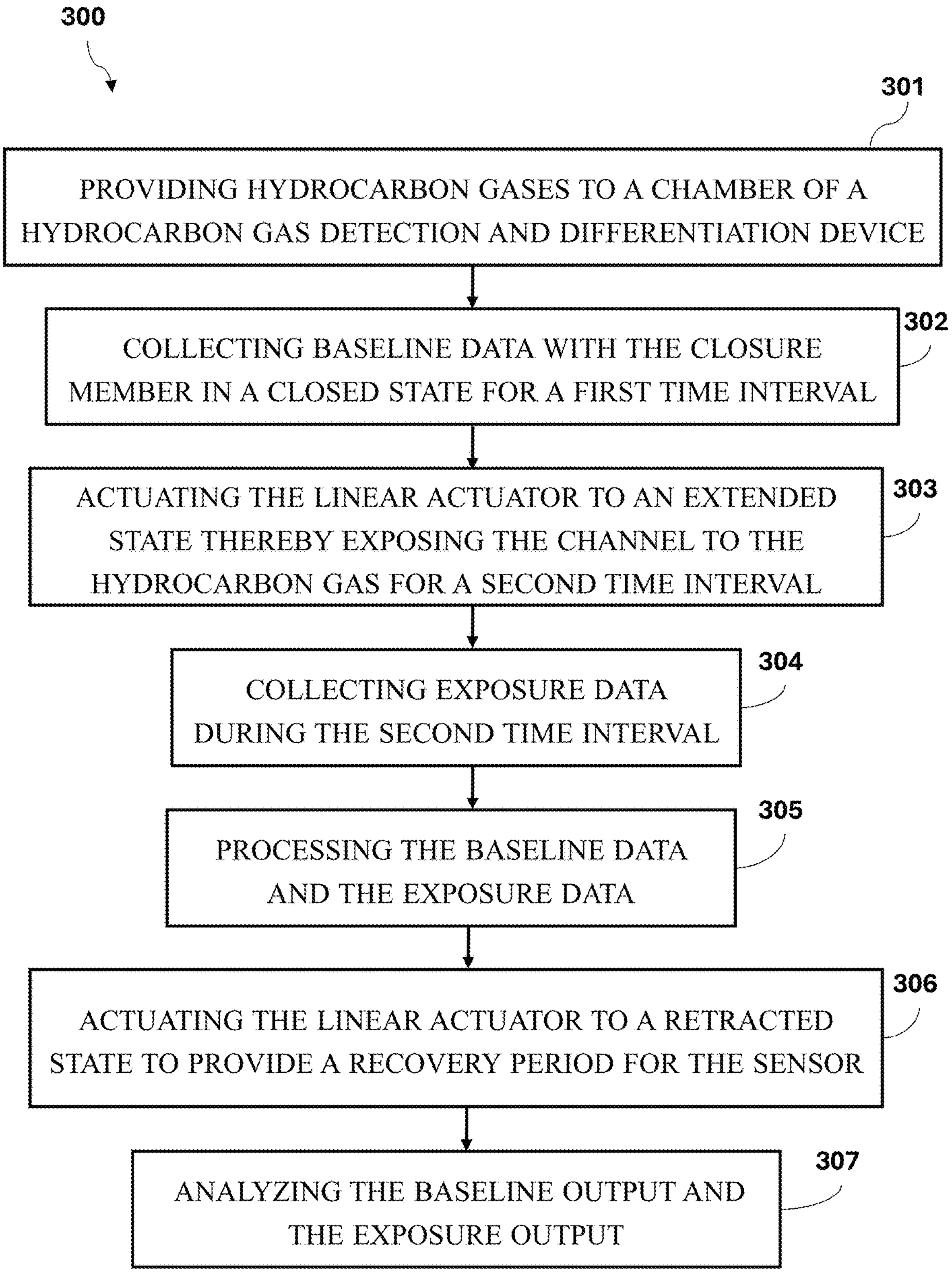
FIG. 4 shows a schematic illustration of a method for use with the apparatus shown in FIG. 3 according to some embodiments of the present disclosure.

In some embodiments, the second housing portion 10B may be configured to receive a portion of the inlet end 43 of the sensing unit 40, and comprises at least one chamber 14 (shown in FIG. 4B). As used herein, the expression "configured to receive a portion of the inlet end" means that the structure of the second housing portion 10B allows for at least a portion of the inlet end 43 to be housed and/or enclosed and/or retained within the second housing portion 10B. As used herein, the term "chamber" refers to a cavity or void space. The at least one chamber 14 of the second housing portion 10B may receive therein a gas or a gaseous mixture. In some embodiments, the at least one chamber 14 is in fluid communication with a hydrocarbon gas source. In a particular embodiment, the hydrocarbon gas source may be a leaking natural gas pipeline.

The apparatus 100 further comprises a closure member 52 housed within the second housing portion 10B and adjacent the inlet 42, the closure member 52 actuatable between a closed state and an open state by the linear actuator 30 (see FIG. 1). As used herein, the term "closure member" referred to a component that modulates the fluid communication between the at least one chamber 14 and the inlet 52. As used herein, the term "closed state" refers to a position of the closure member 52 that prevents fluid communication between the at least chamber 14 and the inlet 42. Similarly, as used herein, the term "open state" refers to a position of the closure member 52 that allows fluid communication between the at least one chamber 14 and the inlet 42. The open state of the closure member 52 may be partially open or completely open. In some embodiments, the closure member 52 is in the open state when the linear actuator 30 is in an extended or partially extended position and is in the closed state when the linear actuator is in a retracted position. The closure member 52 may be a magnetic plunger, a servo-actuated stopping valve, or an electronically actuated ball valve. In a particular embodiment, the closure member 52 is a magnetic plunger. As used herein, the term "magnetic plunger" refers to an actuatable component comprising an extendible/retractable member and a pair of matched opposite-polarity magnets, wherein the extendible/retractable member is retracted when: (i) in a resting state, (ii) extends outward when actuated for example by application of an electric current to the matched patents to thereby cause reversing of the polarity of one of the magnet thereby forcing the pair of magnets to separate, and (iii) when the electrical current is stopped, retracts by the return of the pair of magnets to their opposite polarity.

The apparatus 100 may further comprise two or more mounting rods 50. In some embodiments, the two or more mounting rods 50 may be housed within the second housing portion 10B. In some embodiments, the second housing portion 10B may be configured to receive the two or more mounting rods 50 in two or more mounting bores 54. In some embodiments, the two or more mounting bores 54 may be adjacent to the sensing unit 40 as shown in the embodiment of FIG. 2. The mounting bores 54 allow the entire apparatus 100 to be mounted onto the two or more mounting rods 50 and actuated via the linear actuator 30. previous work has demonstrated the suitability of this type of apparatus for nuisance sewer gas detection [16], wine identification [17], and discrimination of biomarker gases [18]. The skilled person will appreciate that the mounting rods 50 and the mounting bores 54 may be placed in any location suitable to operatively couple the apparatus to the gas-containing system.

Some embodiments of the present disclosure relate to a system for hydrocarbon gas detection and differentiation. The system comprises: an apparatus for hydrocarbon gas detection and differentiation, the apparatus: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent to the inlet, the closure member actuatable between a closed state and an open state by the linear actuator; wherein the at least one chamber is in fluid communication with the inlet when the closure member is in the open state; a processor for data collection; and a power source.

The hydrocarbon gas detection and differentiation apparatus in the system 200 may be any of the apparatus as described elsewhere herein. In some embodiments, the hydrocarbon gas detection and differentiation system 200 may further comprise an air-introduction component. As used herein, the term "air-introduction component" is intended to refer to a means for introducing clean air into the apparatus. In some embodiments, the air-introduction component is an external air supply such as an air compressor, or a fresh air intake with a mini-internal pump.

In some embodiments, the processor for data collection may a Raspberry Pi microcomputer, a customized printed circuit board (PCB), an ARM™ microcontroller, or an ATmega™ microcontroller with an i/o interface for controlling all components onboard. In a particular embodiment, the processor is a Raspberry Pi microcomputer. In another particular embodiment, the processor may be a customized PCB. In some embodiments, the power source is an electrical power source.

Figure 3:
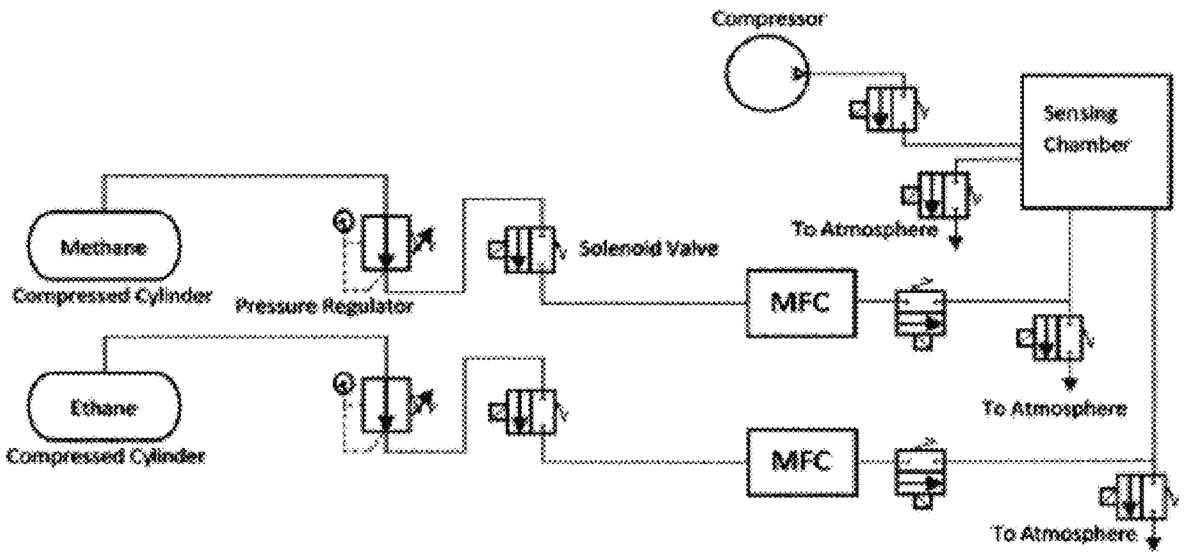
FIG. 3 is a schematic illustration of an automatic sample generation system used in the Examples disclosed herein.

FIG. 3 illustrates an exemplary system 200 according to some embodiments of the present disclosure. In this embodiment, the system 200 is a data generation system for providing customized gas mixtures and collecting data from the apparatus, such as the apparatus 100, in an automated fashion.

In some embodiments, the present disclosure relates to a method for hydrocarbon gas detection and differentiation. The method comprises: providing hydrocarbon gases to a chamber of a hydrocarbon gas detection and differentiation apparatus, the hydrocarbon gas detection and differentiation apparatus comprising: a sensing unit comprising an inlet at an inlet end, a channel in fluid communication with the inlet, and a sensor in fluid communication with the channel, the sensor at an end of the channel opposite the inlet end; a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator; collecting baseline data with the closure member is in a closed state of a first time interval;

actuating the linear actuator to an extended state, thereby exposing the channel to the hydrocarbon gas for a second time interval; collecting exposure data during the second time interval; and processing the baseline data and the exposure data. In some embodiments, the step of processing (i) provides a baseline output and an exposure output for analyses and comparisons thereof, and a summary report for the analyses and comparisons, (ii) determines if there are significant differences between the baseline output and the exposure output and if significant differences are identified, (iii) produces a summary report for the determination, and communicates an alert and the summary report of the identified significant differences to a recipient.

FIG. 4A is a schematic representation of an exemplary method 300 of detecting and differentiating hydrocarbon gases, according to the present disclosure. The method 300 comprises a step of providing hydrocarbon gases to a chamber of a hydrocarbon gas detection and differentiation device (301). The step of providing may be active (such as, for example, by injection of a sample mixture) or passive (such as, for example, gas dissipating/diffusing from a crack or a hole in a pipeline) and may occur when the closure member is in a closed state. In a particular embodiment, the step of providing comprises pumping a sample comprising hydrocarbon gases to the chamber of the hydrocarbon gas detection and differentiation apparatus.

The method 300 comprises a step of collecting baseline data with the closure member in a closed state for a first time interval (302). The collecting may be by any suitable data processor such as, for example, a Raspberry Pi microcomputer, a customized printed circuit board (PCB), an ARM™ microcontroller, or an ATmega™ microcontroller with an i/o interface for controlling all components onboard. In some embodiments, the first time interval may be between about 8 seconds and about 12 seconds. In an embodiment, the first time interval may be about 8 seconds, about 9 seconds, about 10 seconds, about 11 seconds, or about 12 seconds. In a particular embodiment, the first time interval is 10 seconds.

At the end of the first time interval, the method 300 comprises steps of actuating the linear actuator to an extended state thereby exposing the channel to the hydrocarbon gas for a second time interval (303), and collecting exposure data during the second time interval (304). In an embodiment, the actuating may be manual. In an embodiment, the actuation may be automatically triggered, for example, with solenoid valves operated by a Raspberry Pi microcomputer. In some embodiments, the second time interval nay be between about 30 seconds and about 50 seconds. In some embodiments, the second time interval may be between about 35 seconds and about 40 seconds. In an embodiment, the second time interval may be about 35 seconds, about 36 seconds, about 37 seconds, about 38 seconds, about 39 seconds, about 40 seconds, about 41 seconds, about 42 seconds, about 43 seconds, about 44 seconds, or about 45 seconds. In a particular embodiment, the second time interval is 40 seconds.

Figure 6:
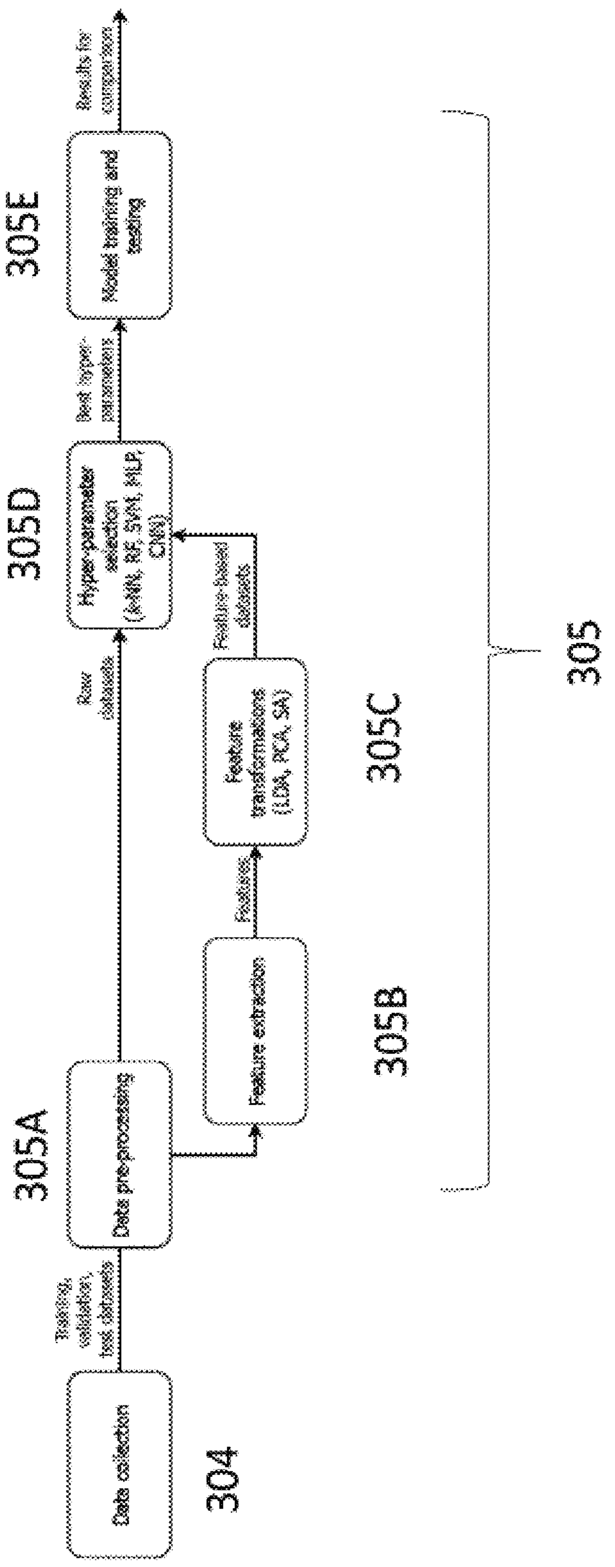
FIG. 6 is a schematic of a series of data collection and analysis steps, according to some embodiments of the present disclosure.

At the end of the second time interval, the method 300 comprises a step of processing the baseline data and the exposure data (305). In some embodiments, and as schematically illustrated in FIG. 6, the step of processing 305 comprises pre-processing the exposure data (305A); extracting features from the exposure data (305B); performing transformations on the extracted features (305C); selecting hyper-parameters (305D); and performing model training and testing (305E), which collectively may be referred to herein as machine learning. Therefore, in some embodiments, the present disclosure relates to incorporation of machine-learning analyses to discover patterns in an MOS sensor's time-series response to an unknown target sample after diffusion through a microchannel, wherein individual gases present in the target sample are differentiated based on their rates of diffusion and physical adsorption.

In some embodiments, the step of processing (305) provides a baseline output and an exposure output. In some embodiments, the method 300 comprises a step of analyzing the baseline output and the exposure output (307). The step of analyzing 307 may comprise correlating and comparing the baseline output and the exposure output to determine differences therebetween. In an embodiment, if the baseline output and the exposure output are substantially or completely the same, an electronic summary report may be generated and communicated to a recipient as a digital display and/or may be saved to a designated file. In an embodiment, if differences are identified above a predetermined threshold, a recipient is alerted such as, for example, by an alarm and/or a display message.

In some embodiments, the machine-learning analyses comprise feature representation and extraction using geometric and transform-based features. In some embodiments, wavelet features may be generated by using a Daubechies mother wavelet (db6), decomposing each time-series signal to the maximum level, and taking the approximation coefficients as features. In some embodiments, extracting features from the exposure data and performing transformations on the extracted features comprises feature selection by simulated annealing (SA) and dimension-reduction transformations using principal components analysis (PCA) and linear-discriminant analysis (LDA). In some embodiments, the hyper-parameter selecting comprises learning models such as k-nearest-neighbors (k-NN), random forest (RF), support vector machine (SVM), multi-layer perceptron (MLP), and convolutional neural network (CNN). At least one advantage of this approach is that it may be readily extended to a wider range of target gases by adding additional MOS sensors with certain selected sensitivities. Due to the nature of machine-learning analyses, the selected sensors do not need to be specifically sensitive to the target gases, since the response patterns will be learned during repeated usage.

In some embodiments, the method 300 further comprises a step of actuating the linear actuator to a retracted state, thereby providing a recovery period for the sensor (306). In some embodiments, the recovery period may be between about 140 seconds and about 160 seconds. In some embodiments, the recovery periods may be between about 145 seconds and about 155 seconds. In an embodiment, the recovery periods may be about 145 seconds, about 146 seconds, about 147 seconds, about 148 seconds, about 149 seconds, about 150 seconds, about 151 seconds, about 152 seconds, about 153 seconds, about 154 seconds, or about 155 seconds. In a particular embodiment, the recovery period is about 150 seconds.

Figure 5C:
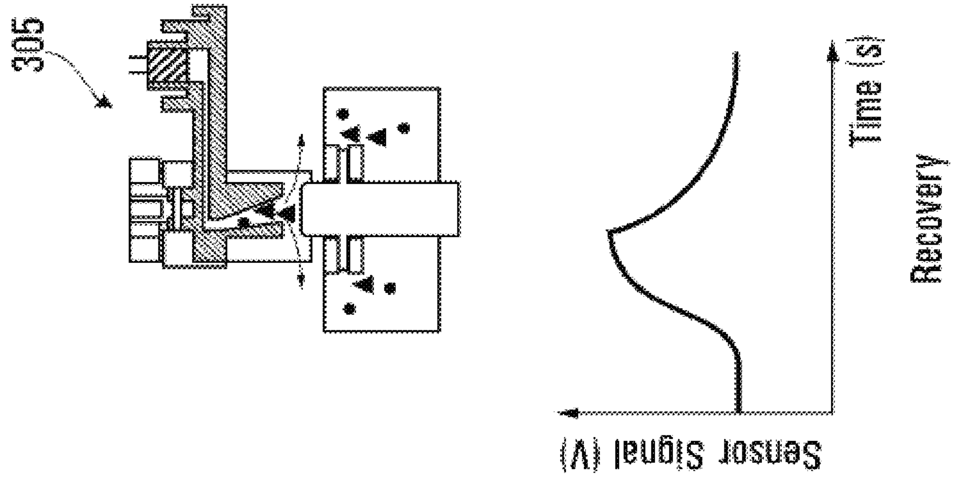
FIG. 5C shows the state and data collection during a recovery phase.
Figure 5B:
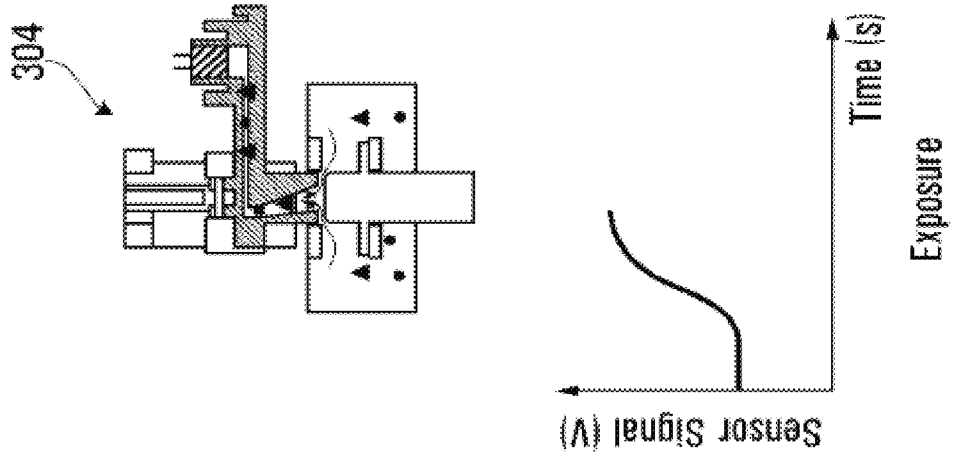
FIG. 5B shows the state and data collection during an exposure phase.
Figure 5A:
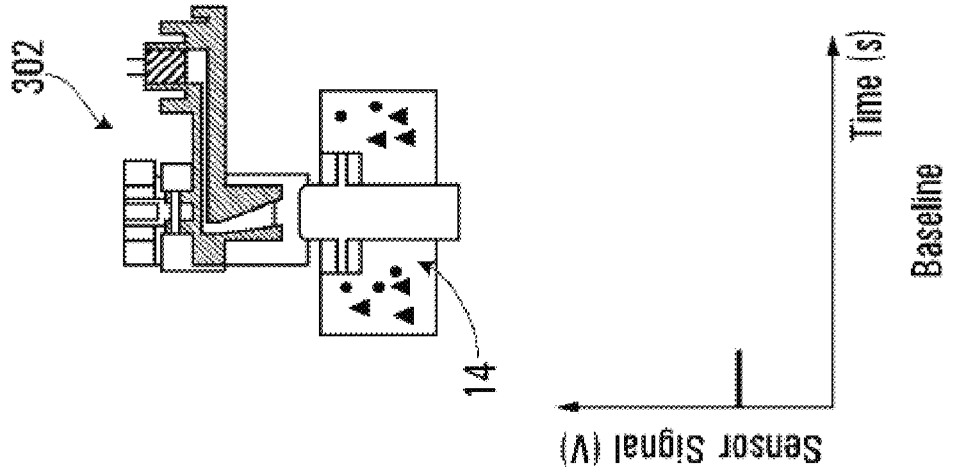
FIG. 5A shows the baseline data collection.

Select steps of an exemplary method of the present disclosure are illustrated in FIGS. 5A, 5B, 5C. In this embodiment, a binary mixture sample is represented by the circles and squares. Before exposure, the sensor signal is at its baseline value and the sample is contained within the chamber 14. The linear actuator 30 depresses the magnetic plunger 52, allowing the sample to diffuse along the microchannel 44 towards the sensor 46. The sensor signal rises as the gas reaches the sensor 46. Finally, the actuator 30 retracts, sealing the sample inside the chamber 14 once more. The vapor particles inside the microchannel 44 begin to diffuse back into the open air, and the sensor signal drops toward its baseline value.

The compact size of the apparatus disclosed herein enables use for both stationary and mobile applications, which is particularly advantageous in the context of pipeline leak detection. Non-limiting examples of applications in which the apparatus of the present disclosure may be used include in a commercial testing laboratory, transportable in a service truck, in municipal utilities facilities, in commercial or residential buildings (for example, in utility rooms).

A significant benefit of this design is that the apparatus of the present disclosure can be readily fit into a portable detector, making use of the potential for microfluidics in creating self-contained devices [19]. The peripheral requirements for such a detector are minimal, limited to data collection hardware, a power source, and some method (either manual or automated) of flushing the interior with clean air in case of vapor contamination. Therefore, the apparatus disclosed herein may be suitable for use as a handheld device.

Further, the apparatus, systems, and methods disclosed herein may classify samples of hydrocarbon gases (e.g. methane, ethane) and simulated natural gas based on time-series data collected from a low-cost apparatus, which may provide selectivity based on diffusion times of different individual gases. The machine-learning models, analyses, and data representation methods disclosed herein demonstrate the feasibility of discriminating methane from target natural gas mixtures, and also, obtaining accurate concentration estimates in random binary mixtures of methane and ethane.

The ability to discriminate between mixtures and pure gases, as well as mixture quantification, may be useful in many other applications wherein different binary mixtures may need to be distinguished from each other before concentration estimation can be done. The experimental work presented herein demonstrates that such a task can be accomplished using apparatus, systems and methods disclosed herein.

The skilled person will appreciate that this methodology may be extended beyond studying mixtures of two simple hydrocarbons, by incorporating the results of extra sensors with different sensitivities. In all possible cases, the prediction accuracies may be improved by also examining sensor responses on shorter/longer timescales than that disclosed herein.

EXAMPLES

Various alternative embodiments and examples are described herein. These embodiments and examples are illustrative and should not be construed as limiting the scope of the invention.

Example 1

Generally, the experimental procedures for the following examples included sets of time-series data samples collected in three phases for each set: a baseline phase, an exposure phase, and a recovery phase. The first 10 seconds of each test set was the baseline phase during which, the sensor's response to ambient air was measured. During the exposure phase, the sensor was introduced to a target analyte for 40 seconds during which the analyte diffused along the microchannel and was adsorbed onto the MOS sensor. Finally, the sensor was regenerated during the recovery phase with a stream of fresh air for 150 seconds to thereby allow the target analyte to diffuse and exit the channel, and to return the sensor reading to the clean air baseline. Collectively, the entire test cycle for each data set (FIG. 3) was completed in 200 seconds at a rate of one sample measurement per second.

The data collected at each time point was the voltage across a known load resistor connected in series with the MOS sensor, for the purpose of calculating the resistance of the MOS sensor. Gas mixture samples were created using mass-flow controllers with methane and ethane standards purchased from Praxair. After the required amounts of methane and ethane were dosed into the chamber and reached a homogenous mixture, the inlet of the sensor was introduced into the sensing chamber by the linear actuator. After the exposure phase, the linear actuator was retracted, and the inlet was refreshed with a clean air stream.

The sensing chamber was flushed with clean air between each test set. The entire process was controlled automatically with solenoid valves operated by a Raspberry Pi microcomputer.

A schematic diagram of the experimental apparatus, excluding the sensing apparatus and linear actuator, is shown in FIG. 3.

The microchannel of the apparatus used in the examples disclosed herein was 3D printed, had a channel length of 30 mm, a width of 3 mm, and a height of 1 mm, and was coated with a parylene-C polymer to facilitate and enhance physical adsorption of the gases. A Figaro TGS2610 metal oxide semiconducting gas sensor (Figaro USA Inc., Arlington Heights, IL, USA) was embedded at the end of the 3D-printed microchannel The data pre-processing methods used in this example were based on the objective for each experiment. For data used in classification, the shapes of the response curve were more important than amplitude so therefore, z-normalization was used. For experiments where the goal was concentration regression, scale-dependent information needed to be preserved, so datasets were scaled into the [0, 1] interval while preserving relative-scale differences between samples.

Example 2

Methods of representation of time-series data may have important impacts on the performance of machine-learning models.

Feature representations and extraction. There are infinite different features that could be used to represent the time-series curves, the majority of which can be grouped into three broad categories: (1) features generated geometrically from different segments of the response curve for example, values at a certain points in time, derivatives, or integrals), (2) curve fitting for example, using coefficients of a p-order polynomial as features, and (3) transformations for example, Fourier or wavelet transforms) [20]. In the present disclosure, both geometric and transform-based features were extracted to preserve diverse amounts of information. Wavelet features were generated by using a Daubechies mother wavelet (db6), decomposing each time-series signal to the maximum level, and taking the 22 approximation coefficients as features.

The approximation coefficients were used because the sensor-response signals were at low frequencies. Wavelet decomposition was accomplished using the PyWavelets Python package [21][22]. Fourier domain features were obtained by applying a Fast Fourier Transform (FFT) to the data, and the values were squared to obtain estimates of the Power Spectral Density (PSD). Most of the power in the time-series signals existed in the low-frequency components. For this reason, the lowest eight PSD components were selected to be used as features. A full description of all 120 extracted features is provided in Table 1.

TABLE 1

Description of extracted features.

| Feature Number | Feature Description |
|---|---|
| 1 | Peak value |
| 2 | Area under curve from $t_0$ to $t_{half\text{-}peak,\ exposure}$ |
| 3 | Area under curve from $t_0$ to $t_{peak}$ |
| 4 | Area under curve from $t_{peak}$ to $t_{half\text{-}peak,\ recovery}$ |

TABLE 1-continued

Description of extracted features.

| Feature Number | Feature Description |
|---|---|
| 5 | Area under curve from $t_{peak}$ to $t_{end}$ |
| 6 | Total area under curve |
| 7 | Slope of line from 5% of peak to 95% of peak |
| 8 | Slope of line from 95% of peak to end |
| 9-18 | Time to reach 10%, 20% . . . 100% of peak (exposure phase) |
| 19-24 | Time to reach 90%, 80% . . . 40% of peak (recovery phase) |
| 25-41 | Signal value at t = 10 s, 20 s . . . 170 s |
| 42-57 | Derivative of the signal at t = 20 s, 30 s . . . 170 s |
| 58-73 | Second derivative of the signal at t = 20 s, 30 s . . . 170 s |
| 74-90 | Value at t = 10 s, 20 s . . . 170 s after normalizing signal in [0, 1] |
| 91-112 | DWT coefficient 1, 2 . . . 22 |
| 113-120 | FFT coefficient 1, 2 . . . 8 |

After the features were extracted and the optimal subsets selected, a common processing method was used to make the distributions of each of the features have a mean of zero and a standard deviation of one. This was conducted in a step called "data whitening" [23], which ensured that one feature with a much larger magnitude did not dominate the contributions of the others.

Feature selection. Simulated annealing (SA) [24] was used as the feature subset search criterion, and symmetric uncertainty was used as the subset quality metric. Symmetric uncertainty is an information-theoretic measure of correlation that can accommodate non-linear data. This approach allowed for the ranking of feature subsets based on the correlations between the features contained in the subset, and the target output(s). This metric is used, for example, in the Fast Correlation-Based Filter [25]. Symmetric uncertainty requires discrete features and target variables, so before analysis, features were discretized using the method of Fayyad and Irani [26], for partitioning the features based on information gain. For the experiments involving multi-target regression, the symmetric uncertainty of each feature was calculated as the average symmetric uncertainty between that feature and each of the regression targets.

Dimensionality-reducing transformations. In addition to using simulated annealing to reduce the size of the feature set, two different dimension-reduction transformations were tested as alternatives: (i) principal components analysis (PCA), and (ii) linear discriminant analysis (LDA). For the PCA transform, the number of components selected was such that the explained variance was >99% in the classification case, whereas the maximum number of components was chosen for the LDA transformation because this is only two components for a three-class discrimination problem. The LDA transform was not applied to regression experiments since it relies on having categorical targets.

Example 3

Machine learning models and hyper-parameters. An important step in machine learning is to select the optimal hyper-parameters that are non-trainable parameters of the model. The process of finding suitable values for these parameters is highly application dependent, and there are no values that are universally better than others.

A simple method of hyper-parameter selection is a grid search, in which every possible combination from a specified list of values is tried for each hyper-parameter. The quality of each set of hyper-parameters is quantified by the performance of the model trained using those parameters, evaluated on the validation dataset. The actual reported performance is then evaluated on the test dataset, using the best hyper-parameters found on the validation dataset. This procedure avoids bias by using the test set only for evaluation, and not for model optimization.

The machine-learning models compared in this work were k-nearest-neighbours (k-NN), random forest (RF), support vector machine (SVM), multi-layer perceptron (MLP), and convolutional neural network (CNN). Most of the hyper-parameters were selected via grid search, with a few exceptions as described below. The grid-search values for each model are listed in Table 2.

TABLE 2

Hyper-parameter grid-search values for k-NN, RF, SVM, MLP and CNN models.

| Model | Hyper-parameter | Description | Grid-search values |
|---|---|---|---|
| k-NN | k | Number of nearest neighbours to compare to test sample | 1, 3, 5 |
| RF | n_trees | Number of trees to ensemble | 25, 50, 100, 200, 400, 800 |
| | max_depth | Maximum depth of each tree | 3, 5, 7, 9, 11 |
| SVM | C | Penalty coefficient for incorrect classifications | $10^{-1}, 10^{0}, \ldots, 10^{5}$ |
| | γ | Controls how strongly samples affect the decision surface | $10^{-6}, 10^{-5}, \ldots, 10^{1}$ |
| MLP | n_layers | Number of hidden layers | 1, 2 |
| | layer_width | Number of neurons in each hidden layer | 8, 16, 32 |
| | learning_rate | Learning rate | 0.001, 0.01 |
| | λ | L2 regularization coefficient | $10^{-4}, 10^{-3}, 10^{-2}, 10^{-1}, 0$ |
| | n_epochs | Number of training epochs | ≤2000 |
| CNN | n_conv_layers | Number of convolution layers | 1, 2 |
| | filter_length | Size of each convolution filter | 32, 64, 96 |
| | n_filters | Number of convolution filters | 8, 16, 32 |
| | learning_rate | Learning rate | 0.001, 0.01 |
| | λ | L2 regularization coefficient | $10^{-4}, 10^{-2}, 0$ |
| | n_epochs | Number of training epochs | ≤2000 |

n_trees is the number of decision trees ensembled together in the RF model. The performance of RF typically improves with a greater n_trees, with computational time as a trade-off. However, this improvement can be difficult to quantify with a simple hyper-parameter grid search, since the improvement comes in the form of reducing the classifier's variance. For this reason, n_trees was chosen ahead of time by selecting max_depth=3 and constructed 30 random forests for each n_trees in the set of {25, 50, 100, 200, 400, 800} using the training dataset without extracting features. The variance in the performances of these 30 models reached zero with $n_{trees}$=800, so this value was used in all following experiments.

n_epochs is the number of training epochs used for the MLP model. The optimal number of training epochs is determined by evaluating the performance of the network on the validation set after each epoch, and examining when the validation performance begins to degrade. An increasing validation error while the training error continues to drop is an indication of over-fitting. The ideal hyper-parameters are chosen based upon which achieve the lowest validation loss at any point during training, and the best n_epochs was the number of epochs after which this minimum loss was achieved. A maximum number of 2000 training epochs was selected to constrain training to a reasonable timeframe.

The structure of a CNN requires more hyper-parameters than a MLP. The CNN-specific hyper-parameters are the number of convolutional layers (n_conv_layers), filter length (filter_length), and number of filters (n_filters). In addition to the convolutional layers, networks of this type commonly have fully-connected layers after them, which adds new hyper-parameters for the number and width of these layers. The number of parameters to optimize was reduced by making a few assumptions about an effective structure for the overall network, taken partly from AlexNet (a successful image classification CNN in 2012 [27]). A max pooling operator was used after each convolutional layer, and stack two fully-connected layers after the final convolutional layer. The size of the filters was also halved for subsequent convolutional layers after the first, but the number of filters was kept constant. In addition to the hyper-parameters specific to the CNN, learning_rate, λ, and n_epochs were used as in the MLP model. A coarser search was performed over values of λ to compensate for the additional computation time. The procedure for finding the optimal n_epochs, as well as the training loss functions used, were both the same as for the MLP.

Example 4

Discrimination between pure methane and natural gas with a 1-3% ethane content was achieved through the use of a single MOS chemical sensor in an apparatus of the present disclosure. The same sensing apparatus was used to predict concentrations of both methane and ethane in arbitrary binary mixtures of the two gases by employing machine learning techniques disclosed herein. The use of k-nearest-neighbors, random forests, multilayer perceptron, support vector machines, and convolutional neural networks as classification and regression models was investigated. Results based on the use of hand-designed features to those obtained from the raw time-series data were compared. An overview of the data collection and analysis process that was used is shown in FIG. 6, including pipelines for both the raw data and feature-based representations. The numbers of samples and dimensionalities for each dataset are given in Tables 3 and Table 4, respectively. For all datasets used, the number of repeats for each sample was 1.

TABLE 3

Number of samples in each dataset.

| | Training | Validation | Test |
|---|---|---|---|
| Experiment I: arbitrary mixtures | 120 | 80 | 80 |
| Experiment II: simulated natural gas | 60 | 30 | 30 |

TABLE 4

Dimensionality of samples in each dataset.

| | | Classification | Regression |
|---|---|---|---|
| Experiment I: arbitrary mixtures | PCA transformed | 3 | 3 |
| | LDA transformed | 2 | — |
| | SA selected | 6 | 20 |
| | Full feature set | 120 | 120 |
| | Raw data | 200 | 200 |
| Experiment II: simulated natural gas | Raw data | 200 | 200 |

Example 5

The classification tests performed quantify the model accuracy when distinguishing between pure methane, pure ethane, and arbitrary mixtures of the two, whereas regression tests determined the accuracy of the concentration estimates. The machine learning training data used included pure methane and pure ethane samples with concentrations of 100, 200 . . . 1000 ppm, as well as binary mixtures with all combinations of these concentrations. Therefore, the training dataset contained 10 methane samples, 10 ethane samples, and 100 mixture samples for a total of 120 samples. The validation and test datasets both included 20 pure methane samples, 20 pure ethane samples, and 40 binary mixture samples for a total of 80 samples each. All concentrations for the validation and test set samples were randomly chosen between 100 and 1000 ppm. For the classification experiments, the prediction targets were the sample class (methane, ethane, or mixture), and for the regression experiments, they were the 2 known concentration values.

The quality metric used to quantify classifier performance is the classification accuracy (CA), which is the ratio of correct predictions ($n_{correct}$) to the number of total predictions ($n_{total}$):

$$CA = \frac{n_{correct}}{n_{total}} \tag{1}$$

Determining a suitable test quality metric for the regression experiments is more nuanced than for classification. The most typical choice is the use of the Mean-Squared Error (MSE), as is used in the training phase for neural networks. However, Mean Absolute Error (MAE) can be preferable for interpretability since the units are the same as the units of gas concentration (that is, ppm). Regression errors can also be expressed as a percentage of the target concentration to provide quality estimates that account for target range width. For this reason, alongside the MAE is also presented the Mean Absolute Percentage Error (MAPE). However, there is a complication with the use of MAPE as a quality metric, since some of the targets needed to be predicted were zero. To compensate for this and to determine explicitly how well the model of the present disclosure was able to detect the absence of one of the target gases (i.e. zero concentration target), the zero-valued concentrations from the MAPE calculation were excluded, and one other quality metric, referred to as the Mean Zero Target Prediction Error (MZTPE), was included. The MZTPE measures the average model prediction for zero-valued targets.

$$MAE = \frac{1}{pn}\sum_{i=0}^{n}\sum_{j=0}^{p}|y_{ij} - y_{pred,ij}| \tag{2}$$

-continued $$MAPE = \frac{1}{pn_{non-zero}} \sum_{i=0}^{n} \sum_{j=0}^{p} \frac{|y_{ij} - y_{pred,ij}|}{y_{ij}}, \text{ for } y_{ij} \neq 0 \tag{3}$$

$$MZTPE = \frac{1}{pn_{zero}} \sum_{i=0}^{n} \sum_{j=0}^{p} |y_{ij} - y_{pred,ij}|, \text{ for } y_{ij} = 0 \tag{4}$$

In the above relations, $y_{ij}$ refers to the $j^{th}$ concentration target for the $i^{th}$ data sample, $y_{pred,ij}$ is the model's prediction of $y_{ij}$, n is the number of samples, p is the number of concentration targets, and $n_{zero}$ and $n_{non-zero}$ are the number of zero valued and non-zero valued concentration targets, respectively. Since 2 gas concentrations are being predicted (methane and ethane), p is equal to two.

In this experiment, both feature-based and feature-less methods were compared. The features used to represent the data are described in Table 1, and four different representations were generated from these features: (i) transformed by PCA, (ii) transformed by LDA, (iii) selected by SA, and (iv) the original full feature set. The only transformations performed on the raw data were the pre-processing steps: z-normalization for the classification case, and dataset compression between 0 and 1 for the regression case. The hyper-parameter selection method was a grid search.

The process of using simulated annealing to select from the full list of extracted features for the classification task yielded a subset of 6 out of the possible 120 features, and a subset of 20 features for the regression task. The numbers of these features as corresponding to Table S1 are 20, 23, 46, 81, 82, and 89 for classification and 2, 46, 49, 51, 52, 54, 55, 59, 61, 63, 64, 66, 68, 70, 71, 73, 80, 95, 104, and 119 for regression. It follows that less features would be needed for classification, since regressing the two unknown concentrations should be a much more difficult task. An interesting point about the regression features is that only one area-based feature was selected, but 15 features based on first and second derivatives were chosen. This indicates that the slopes and shapes of the curves are important for the multi-target regression.

The results for the best hyper-parameters, validation set and test set classification accuracies (CA) for each of the datasets are given in Table 5 through Table 9.

TABLE 5

Hyper-parameter optimization and test results for classification of arbitrary mixtures using PCA feature representation.

| | Best hyper-parameters | Best Validation Set CA (%) | Test Set CA (%) |
|---|---|---|---|
| k-NN | k = 1 | 100 | 97.5 |
| RF | max_depth = 9 | 91.25 | 87.5 |
| SVM | C = 10 | 100 | 96.25 |
| | γ = 0.1 | | |
| MLP | n_layers = 2 | 100 | 97.5 |
| | layer_width = 16 | | |
| | learning_rate = 0.01 | | |
| | λ = 0 | | |
| | n_epochs = 1974 | | |

TABLE 6

Hyper-parameter optimization and test results for classification of arbitrary mixtures using LDA feature representation.

| | Best hyper-parameters | Best Validation Set CA (%) | Test Set CA (%) |
|---|---|---|---|
| k-NN | k = 1 | 55.00 | 55.00 |
| RF | max_depth = 3 | 71.25 | 68.75 |
| SVM | C = 0.1 | 60.00 | 56.25 |
| | γ = 1 | | |
| MLP | n_layers = 1 | 72.50 | 65.00 |
| | layer_width = 16 | | |
| | learning_rate = 0.001 | | |
| | λ = 0.0001 | | |
| | n_epochs = 40 | | |

TABLE 7

Hyper-parameter optimization and test results for classification of arbitrary mixtures using SA feature representation.

| | Best hyper-parameters | Best Validation Set CA (%) | Test Set CA (%) |
|---|---|---|---|
| k-NN | k = 1 | 75.00 | 76.25 |
| RF | max_depth = 5 | 86.25 | 83.75 |
| SVM | C = 1000 | 88.75 | 82.5 |
| | γ = 0.001 | | |
| MLP | $n_{layers}$ = 1 | 82.50 | 83.75 |
| | layer_width = 32 | | |
| | learning_rate = 0.01 | | |
| | λ = 0.1 | | |
| | n_epochs = 241 | | |

TABLE 8

Hyper-parameter optimization and test results for classification of arbitrary mixtures using the full feature set.

| | Best hyper-parameters | Best Validation Set CA (%) | Test Set CA (%) |
|---|---|---|---|
| k-NN | k = 5 | 87.50 | 86.25 |
| RF | max_depth = 9 | 97.50 | 98.75 |
| SVM | C = 10 | 91.25 | 95.00 |
| | γ = 0.001 | | |
| MLP | n_layers = 1 | 97.50 | 91.25 |
| | layer_width = 32 | | |
| | learning_rate = 0.01 | | |
| | λ = 0.01 | | |
| | n_epochs = 407 | | |

TABLE 9

Hyper-parameter optimization and test results for classification of arbitrary mixtures using raw data.

| | Best hyper-parameters | Best Validation Set CA (%) | Test Set CA (%) |
|---|---|---|---|
| k-NN | k = 1 | 98.75 | 98.75 |
| RF | max_depth = 3 | 100 | 91.25 |
| SVM | C = 10000 | 100 | 98.75 |
| | γ = 0.1 | | |
| MLP | $n_{layers}$ = 1 | 100 | 97.5 |
| | layer_width = 8 | | |
| | learning_rate = 0.001 | | |
| | λ = 0 | | |
| | n_epochs = 1944 | | |

TABLE 9-continued

Hyper-parameter optimization and test results for classification of arbitrary mixtures using raw data.

| | Best hyper-parameters | Best Validation Set CA (%) | Test Set CA (%) |
|---|---|---|---|
| CNN | n_conv_layers = 1<br>filter_length = 32<br>n_filters = 8<br>learning_rate = 0.001<br>λ = 0<br>n_epochs = 1766 | 100 | 97.5 |

The results for the best hyper-parameters, test set Mean Absolute Error (MAE), Mean Absolute Percentage Error, (MAPE), and Mean Zero-Target Prediction Error (MZTPE) for the regression task are given in Table 10 through Table 13.

TABLE 10

Hyper-parameter optimization and test results for regression of arbitrary mixtures using PCA feature representation.

| | Best hyper-parameters | MAE (ppm) | MAPE (%) | MZTPE (ppm) |
|---|---|---|---|---|
| k-NN | k = 3 | 54.0 | 14.4 | 24.2 |
| RF | max_depth =11 | 57.4 | 14.2 | 36.3 |
| SVM | C = 10000<br>γ = 0.001 | 56.7 | 13.3 | 45.7 |
| MLP | n_layers = 2<br>layer_width = 32<br>learning_rate = 0.01<br>λ = 0<br>n_epochs = 553 | 53.1 | 13.8 | 25.4 |

TABLE 11

Hyper-parameter optimization and test results for regression of arbitrary mixtures using SA feature representation.

| | Best hyper-parameters | MAE (ppm) | MAPE (%) | MZTPE (ppm) |
|---|---|---|---|---|
| k-NN | k = 3 | 141.7 | 29.2 | 137.5 |
| RF | max_depth = 9 | 100.0 | 18.3 | 106.4 |
| SVM | C = 100000<br>γ = 0.1 | 89.4 | 20.0 | 81.4 |
| MLP | n_layers = 32<br>layer_width = 1<br>learning_rate = 0.01<br>λ = 0.01<br>n_epochs = 1026 | 83.5 | 18.1 | 64.7 |

TABLE 12

Hyper-parameter optimization and test results for regression of arbitrary mixtures using the full feature set.

| | Best hyper-parameters | MAE (ppm) | MAPE (%) | MZTPE (ppm) |
|---|---|---|---|---|
| k-NN | k = 5 | 66.4 | 15.7 | 40.5 |
| RF | max_depth = 9 | 57.4 | 12.1 | 52.4 |
| SVM | C = 10<br>γ = 0.001 | 56.5 | 10.8 | 86.1 |
| MLP | n_layers = 32<br>layer_width = 2<br>learning_rate = 0.001<br>λ = 0.001<br>n_epochs = 1948 | 43.2 | 11.5 | 12.7 |

TABLE 13

Hyper-parameter optimization and test results for regression of arbitrary mixtures using the raw data.

| | Best hyper-parameters | MAE (ppm) | MAPE (%) | MZTPE (ppm) |
|---|---|---|---|---|
| k-NN | k = 1 | 65.2 | 17.2 | 15.0 |
| RF | max_depth = 7 | 86.3 | 18.8 | 87.5 |
| SVM | C = 10<br>γ = 1 | 58.9 | 13.9 | 48.0 |
| MLP | n_layers = 2<br>layer_width = 32<br>learning_rate = 0.01<br>λ = 0<br>n_epochs = 1971 | 51.4 | 13.9 | 23.1 |
| CNN | n_conv_layers = 1<br>filter_length = 32<br>n_filters = 32<br>learning_rate = 0.01<br>λ = 0.0001<br>n_epochs = 1604 | 46.2 | 12.0 | 12.1 |

Each table presents results for a different data representation method (PCA, LDA, SA-selected features, the full set of features, or the raw data). Summaries of the best classification and regression results for each model and representation method are also given in Table 14 and Table 15, respectively.

TABLE 14

Summary of the best classification results using each combination of model and representation methods.

| | PCA | LDA | SA | Full set | Raw data |
|---|---|---|---|---|---|
| k-NN | 97.5 | 55.00 | 76.25 | 86.25 | 98.75 |
| RF | 87.5 | 68.75 | 83.75 | 98.75 | 91.25 |
| SVM | 96.25 | 56.25 | 82.5 | 95.00 | 98.75 |
| MLP | 97.5 | 65.00 | 83.75 | 91.25 | 97.5 |
| CNN | — | — | — | — | 97.5 |

TABLE 15

Summary of the best regression results using each combination of model and representation methods. MAE and MZTPE values are in ppm; MAPE values are in %.

| | PCA | | | SA | | | Full set | | | Raw data | | |
|---|---|---|---|---|---|---|---|---|---|---|---|---|
| | MAE | MAPE | MZTPE | MAE | MAPE | MZTPE | MAE | MAPE | MZTPE | MAE | MAPE | MZTPE |
| k-NN | 54.0 | 14.4 | 24.2 | 141.7 | 29.2 | 137.5 | 66.4 | 15.7 | 40.5 | 65.2 | 17.2 | 15.0 |
| RF | 57.4 | 14.2 | 36.3 | 100.0 | 18.3 | 106.4 | 57.4 | 12.1 | 52.4 | 86.3 | 18.8 | 87.5 |
| SVM | 56.7 | 13.3 | 45.7 | 89.4 | 20.0 | 81.4 | 56.5 | 10.8 | 86.1 | 58.9 | 13.9 | 48.0 |

TABLE 15-continued

Summary of the best regression results using each combination of model and representation methods. MAE and MZTPE values are in ppm; MAPE values are in %.

| | PCA | | | SA | | | Full set | | | Raw data | | |
|---|---|---|---|---|---|---|---|---|---|---|---|---|
| | MAE | MAPE | MZTPE | MAE | MAPE | MZTPE | MAE | MAPE | MZTPE | MAE | MAPE | MZTPE |
| MLP | 53.1 | 13.8 | 25.4 | 83.5 | 18.1 | 64.7 | 43.2 | 11.5 | 12.7 | 51.4 | 13.9 | 23.1 |
| CNN | — | — | — | — | — | — | — | — | — | 46.2 | 12.0 | 12.1 |

Figure 7A:
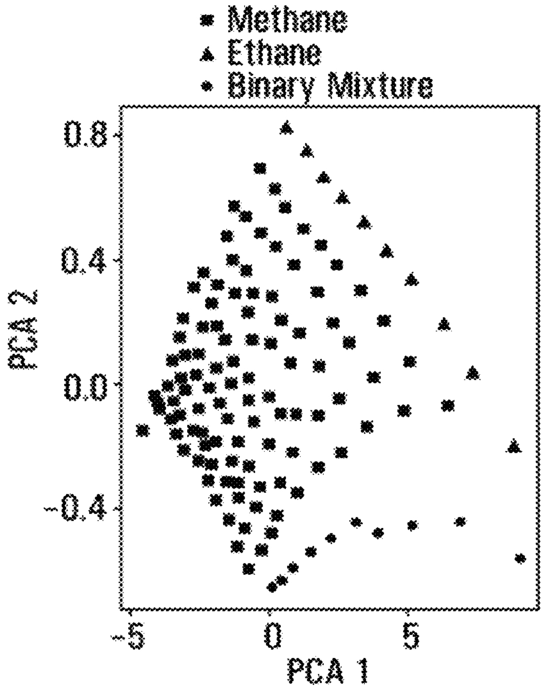
FIG. 7A shows PCA-transformed train data.
Figure 7B:
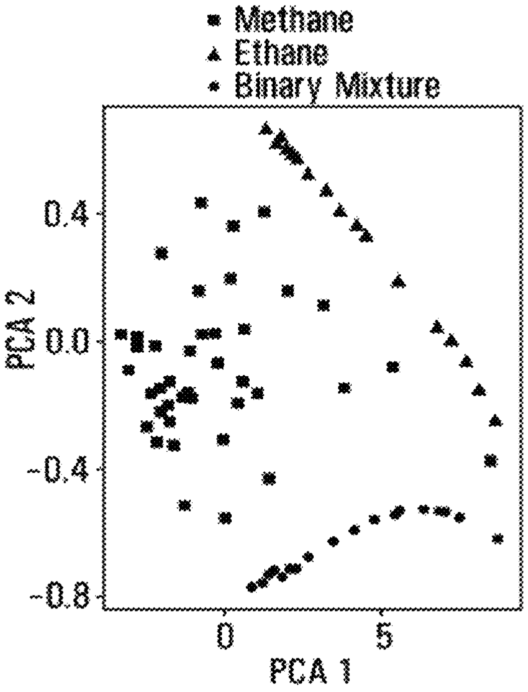
FIG. 7B shows PCA-transformed test data.
Figure 7C:
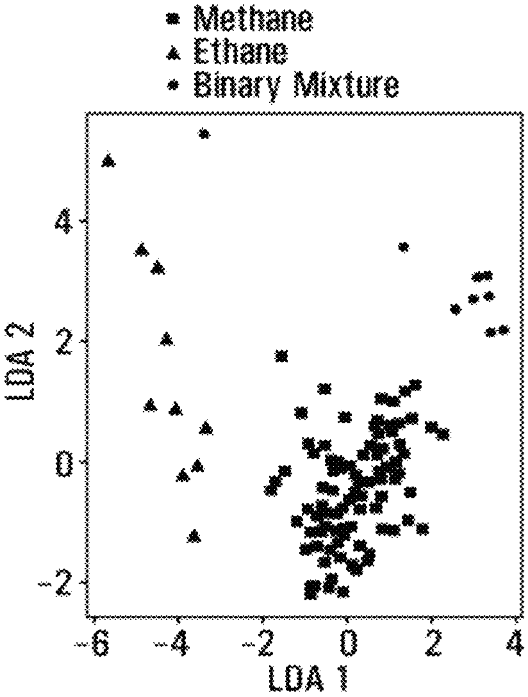
FIG. 7C shows LDA-transformed train data.
Figure 7D:
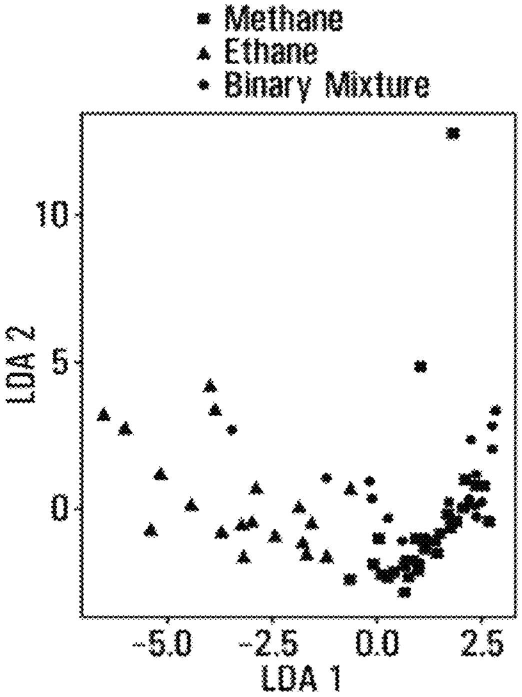
FIG. 7D shows LDA-transformed test data.

From Table 14, it is clear that the choice of data representation method had a significant impact on classification performance. The LDA representation, which should have theoretically maximized inter-class variance, showed poor classification accuracy, with the best test set performance being only 68.75%. To visualize the inferior performance of the LDA transform, the PCA-transformed training and test data and LDA-transformed training and test data were plotted (see FIG. 7). Both the PCA and LDA transforms separated the training data well (FIG. 7A and FIG. 7C, respectively). However, while the PCA transform was also able to separate the test data (FIG. 7B), the LDA transform did not (FIG. 7D). This indicates that the LDA may have over-fitted the transformation based on the labels of the available training data (PCA did not use this information). Accordingly, it appears that LDA would likely perform better with a larger training dataset to improve generalization.

The results in Table 14 also show that the SA-selected features did not perform well compared to the PCA and full feature set representations. Models trained with the PCA-transformed data performed very well during hyper-parameter selection with the k-NN, SVM, and MLP models all achieving 100% classification accuracy on the validation set. However, none of them were able to do so on the test set. In fact, the best test set performance of 98.75% came from the RF model that was trained using the full feature set. The raw data representation produced excellent results on the classification task with each of RF, SVM, MLP, and CNN achieving 100% accuracy on the validation set, and k-NN achieving 98.75%. The performances on the test set demonstrated that the models were also able to generalize well, with the k-NN and SVM models providing the best performance of the feature-based representation, and only the RF showing less than a 97.5% test set accuracy.

A similar trend was observed in the regression test results (Table 15), wherein the performances of each of the models were relatively consistent for a given representation method. In this case, the best MAE and MAPE came from the models trained on the full feature set, while the best MZTPE were from the CNN model trained on the raw data. The fact that the best result for each of the three regression metrics came from different models highlights the difficulty in predicting when certain models will perform better than others. A common observation across all of the representation methods is that the k-NN and RF models tended to perform less well than the SVM, MLP, and CNN models.

Overall, the results for the raw data representation are comparable with the best results from the feature-based representations on both the classification and regression tasks, suggesting that these can be accomplished without any feature design, even using only a single MOS sensor.

Example 6

The results obtained in Example 5 show that predictions using the raw data are comparable with those made using the feature-based representations. For this reason, in another experiment, the procedure was simplified by only using the raw data representation in the simulated natural gas experiments. The performance of a model of the present disclosure was evaluated using two different proportions of the binary methane-ethane mixture to simulate commercial natural gas that varied in composition. These two compositions were (i) 97%/3%, and (ii) 99%/1% of methane/ethane. In this context, distinguishing between the concentration and the composition of the simulated natural gas samples, was required. The term "composition" refers to the relative amounts of methane and ethane that simulate industrial natural gas, and the term "concentration" refers to the amount of this mixture in clean air, calculated from the sum of the methane and ethane concentrations. For example, for a concentration of 1000 ppm with a 1% ethane proportion, the binary mixture composition was 990 ppm methane and 10 ppm ethane in clean air.

An identical procedure for training and testing as in Experiment I was followed in which, training, validation, and test datasets were created. However, separate datasets were needed for the 1% and 3% ethane proportions. Both the training datasets consisted of pure methane samples with concentrations 100, 200 . . . 3000 ppm, and mixtures of either 1% or 3% ethane proportion in the same concentrations, so each of the two training datasets contained a total of 60 samples. For the validation datasets, 15 random concentrations were generated, and 3 samples were created using each, that is 0%, 1%, and 3% ethane. The pure methane (0% ethane) samples were shared by both validation datasets. In this way, each of the two validation datasets contained 15 negative samples (pure methane) and 15 positive samples (either 1% or 3% ethane) with the same concentrations, allowing model performance comparisons to be made solely based on ethane proportion. For instance, if one of the randomly generated test concentrations was 1345 ppm, the mixtures for the validation sets would be generated as pure methane (1345 ppm methane, 0 ppm ethane); 1% ethane (1332 ppm methane, 13 ppm ethane); and 3% ethane (1305 ppm methane, 40 ppm ethane). The same procedure was followed to generate test datasets with 15 new randomly generated concentrations. All concentrations for the validation and test set samples were randomly chosen between 100 and 3000 ppm.

The results of performing classifications between the pure methane samples and the 1% and 3% ethane samples with each of the models are shown in Table 16.

TABLE 16

Test results for classification of simulated natural gas mixtures using raw data representation.

| | Best Validation Set Accuracy (%) | | Test Set Accuracy (%) | |
|---|---|---|---|---|
| | 1% ethane | 3% ethane | 1% ethane | 3% ethane |
| k-NN | 86.7 | 100 | 86.7 | 86.7 |
| RF | 80 | 100 | 80 | 93.3 |
| SVM | 86.7 | 100 | 83.3 | 93.3 |
| MLP | 96.7 | 100 | 83.3 | 86.7 |
| CNN | 96.7 | 100 | 80 | 90 |

All of the models followed a pattern of achieving better classification performance on the 3% ethane datasets than the 1% ethane datasets with the exception of the k-NN model, which performed equally well on both datasets. This is to be expected, since a lower ethane proportion naturally leads to more difficulty in discrimination. In addition, the classification task in Experiment II was significantly more difficult than that in Experiment I, and hence the classification performances in the previous experiment were superior.

The results of regressing both the methane and ethane concentrations in the simulated natural gas samples with 3% and 1% ethane are given in Table 17 and Table 18, respectively.

TABLE 17

Test results for regression of simulated natural gas mixtures with 3% ethane using raw data representation.

| | MAE (ppm) | MAPE (%) | MZTPE (ppm) |
|---|---|---|---|
| k-NN | Methane: 229.2<br>Ethane: 5.2 | Methane: 13.7<br>Ethane: 18.2 | 0.0 |
| RF | Methane: 240.1<br>Ethane: 27.1 | Methane: 13.3<br>Ethane: 29.4 | 8.4 |
| SVM | Methane: 169.0<br>Ethane: 21.6 | Methane: 10.5<br>Ethane: 27.4 | 7.4 |
| MLP | Methane: 192.2<br>Ethane: 7.5 | Methane: 10.9<br>Ethane: 14.9 | 2.0 |
| CNN | Methane: 228.0<br>Ethane: 10.4 | Methane: 12.7<br>Ethane: 18.7 | 1.5 |

TABLE 18

Test results for regression of simulated natural gas mixtures with 1% ethane using raw data representation.

| | MAE (ppm) | MAPE (%) | MZTPE (ppm) |
|---|---|---|---|
| k-NN | Methane: 211.9<br>Ethane: 13.4 | Methane: 14.5<br>Ethane: 34.7 | 7.2 |
| RF | Methane: 290.0<br>Ethane: 4.6 | Methane: 19.3<br>Ethane: 12.6 | 2.3 |
| SVM | Methane: 215.7<br>Ethane: 10.4 | Methane: 15.4<br>Ethane: 41.5 | 3.2 |
| MLP | Methane: 277.2<br>Ethane: 7.7 | Methane: 21.5<br>Ethane: 44.3 | 2.7 |
| CNN | Methane: 392.2<br>Ethane: 11.4 | Methane: 29.0<br>Ethane: 70.4 | 3.8 |

Due to the significantly different range widths for the concentrations of methane and ethane, it appears that the MAE metric would not be appropriate for determining overall quality (for example, an error of 50 ppm for ethane is much more significant than the error for methane). For this reason, the MAE and MAPE metrics were calculated with respect to each individual component. Also, MZTPE was only applicable to ethane in this case, since there were no samples where the concentration of methane is zero.

As in the classification experiment, regression predictions for the 3% ethane dataset were significantly better than those for the 1% ethane dataset. The MLP model provided the best predictions for the 3% ethane sample, achieving only 10.9% error for the methane and 14.9% error for the ethane concentrations. In almost every case, the methane predictions (as measured by MAPE) were better than those for ethane. This is due to the significantly smaller range of possible values that the ethane concentrations can take. For example, for the 3% ethane dataset, the possible values for the methane concentration were 97 ppm-2910 ppm, while the ethane values could range from only 3 ppm-90 ppm. One interesting observation was that the performances of both of the neural network approaches (MLP and CNN) degraded more significantly than the other models when the ethane proportion was decreased. In fact, for the 1% ethane dataset, all other studied regression models out-performed the MLP and CNN in the MAPE metric.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Numeric ranges are inclusive of the numbers defining the range.

The word "comprising" is used herein as an open-ended term, substantially equivalent to the phrase "including, but not limited to", and the word "comprises" has a corresponding meaning.

As used herein, the singular forms "a", "an" and "the" include plural referents unless the context clearly dictates otherwise. Thus, for example, reference to "a thing" includes more than one such thing. Likewise, all terms referred to in plural form are meant to encompass singular forms of the same.

As used herein, the term "about", when referring to a measurable value, refers to an approximately +/−10% variation from a given value. It is understood that such a variation is always included in any given value provided herein, whether or not it is specifically referred to.

Citation of references herein is not an admission that such references are prior art to an embodiment of the present invention.

The invention includes all embodiments and variations substantially as hereinbefore described and with reference to the examples and drawings. Titles, headings, or the like are provided to enhance the reader's comprehension of this document, and should not be read as limiting the scope of the present invention.

REFERENCES

The entire disclosures of all applications, patents, and publications, cited above and below, are hereby incorporated by reference. However, it will be apparent to persons skilled in the art that a number of variations and modifications can be made without departing from the scope of the invention as defined in the claims. The reference to any prior art in this specification is not, and should not be taken as, an acknowledgement or any form of suggestion that that prior art forms part of the common general knowledge in Canada or any other country.

Patent Documents

CA 2,947,079 Apparatus for volatile organic compound (VOC) detection.

Other Publications

[1] EIA, Monthly Energy Review, U.S. Energy Inf. Adm. (2016).
[2] D. A. Kirchgessner, R. A. Lott, R. M. Cowgill, M. R. Harrison, T. M. Shires, Estimate of methane emissions from the U.S. natural gas industry, Chemosphere. 35 (1997) 1365-1390. https://doi.org/10.1016/S0045-6535(97)00236-1.
[3] P. S. Murvay, I. Silea, A survey on gas leak detection and localization techniques, J. Loss Prey. Process Ind. 25 (2012) 966-973. https://doi.org/10.1016/j.jlp.2012.05.010.
[4] I. Brodetsky, M. Savic, Leak monitoring system for gas pipelines, in: Proc.-ICASSP, IEEE Int. Conf. Acoust. Speech Signal Process., 1993: pp. 17-20. https://doi.org/10.1109/icassp.1993.319424.
[5] M. B. Frish, R. T. Wainner, B. D. Green, M. C. Laderer, M. G. Allen, Standoff gas leak detectors based on tunable diode laser absorption spectroscopy, in: Infrared to Terahertz Technol. Heal. Environ., 2005: p. 60100D. https://doi.org/10.1117/12.630599.
[6] M. Rossi, D. Brunelli, A. Adami, L. Lorenzelli, F. Menna, F. Remondino, Gas-drone: Portable gas sensing system on UAVs for gas leakage localization, in: Proc. IEEE Sensors, 2014: pp. 1431-1434. https://doi.org/10.1109/ICSENS.2014.6985282.
[7] A. J. Kidnay, A. J. Kidnay, W. R. Parrish, Fundamentals of Natural Gas Processing, CRC Press, 2006. https://doi.org/10.1201/9781420014044.
[8] U. Bonne, SELECTIVE LEAK-DETECTOR FOR NATURAL GAS, U.S. Pat. No. 4,507,558, 1985.
[9] U. Bonne, R. J. Matthys, SELECTIVE NATURAL GAS DETECTING APPARATUS, U.S. Pat. No. 4,958,076, 1990.
[10] K. Arshak, E. Moore, G. M. Lyons, J. Harris, S. Clifford, A review of gas sensors employed in electronic nose applications, Sens. Rev. 24 (2004) 181-198. https://doi.org/10.1108/02602280410525977.
[11] A. D. Wilson, M. Baietto, Applications and advances in electronic-nose technologies, Sensors. 9 (2009) 5099-5148. https://doi.org/10.3390/s90705099.
[12] C. Wang, L. Yin, L. Zhang, D. Xiang, R. Gao, Metal oxide gas sensors: Sensitivity and influencing factors, Sensors. 10 (2010) 2088-2106. https://doi.org/10.3390/s100302088.
[13] S. R. Morrison, Selectivity in semiconductor gas sensors, Sensors and Actuators. 12 (1987) 425-440. https://doi.org/10.1016/0250-6874(87)80061-6.
[14] R. Gutierrez-Osuna, Pattern analysis for machine olfaction: A review, IEEE Sens. J. 2 (2002) 189-202. https://doi.org/10.1109/JSEN.2002.800688.
[15] M. Paknahad, J. S. Bachhal, A. Ahmadi, M. Hoorfar, Characterization of channel coating and dimensions of microfluidic-based gas detectors, Sensors Actuators, B Chem. 241 (2017) 55-64. https://doi.org/10.1016/j.snb.2016.10.048.
[16] M. M. Montazeri, N. De Vries, A. Afantchao, P. Mehrabi, E. Kim, A. O'brien, H. Najjaran, M. Hoorfar, P. Kadota, A sensor for nuisance sewer gas monitoring, 2017 Ieee Sensors. (2017) 1-3. https://doi.org/10.1109/ICSENS.2017.8234327.
[17] M. Paknahad, A. Ahmadi, J. Rousseau, H. R. Nejad, M. Hoorfar, On-Chip Electronic Nose For Wine Tasting: A Digital Microfluidic Approach, IEEE Sens. J. 17 (2017) 4322-4329. https://doi.org/10.1109/JSEN.2017.2707525.
[18] M. Paknahad, V. Ghafarinia, F. Hossein-Babaei, A microfluidic gas analyzer for selective detection of biomarker gases, in: 2012 IEEE Sensors Appl. Symp., 2012: pp. 1-5. https://doi.org/10.1109/SAS.2012.6166309.
[19] M. Boyd-Moss, S. Baratchi, M. Di Venere, K. Khoshmanesh, Self-contained microfluidic systems: A review, Lab Chip. 16 (2016) 3177-3192. https://doi.org/10.1039/c61c00712k.
[20] J. Yan, X. Guo, S. Duan, P. Jia, L. Wang, C. Peng, S. Zhang, Electronic nose feature extraction methods: A review, Sensors (Switzerland). 15 (2015) 27804-27831. https://doi.org/10.3390/s151127804.
[21] N. H. Lee G, Gommers R, Wasilewski F, Wohlfahrt K, O'Leary A, PyWavelets—Wavelet Transforms in Python, (n.d.). https://github.com/PyWavelets/pywt [Online; accessed 2018-11-20].
[22] I. Batal, M. Hauskrecht, A supervised time series feature extraction technique using DCT and DWT, 8th Int. Conf. Mach. Learn. Appl. ICMLA 2009. (2009) 735-739. https://doi.org/10.1109/ICMLA.2009.13.
[23] S. Wiesler, H. Ney, A Convergence Analysis of Log-Linear Training, Neural Inf. Process. Syst. (2011) 1-9.
[24] I. Fister, X.-S. Yang, I. Fister, J. Brest, D. Fister, A Brief Review of Nature-Inspired Algorithms for Optimization, ArXiv Prepr. (2013). http://arxiv.org/abs/1307.4186.
[25] L. Yu, H. Liu, Feature Selection for High-Dimensional Data: A Fast Correlation-Based Filter Solution, in: Proceedings, Twent. Int. Conf. Mach. Learn., 2003: pp. 856-863.
[26] U. M. Fayyad, K. B. Irani, Multi-interval discretization of continuous-valued attributes for classification learning, in: Proc. Int. Jt. Conf. Uncertain. AI, 1993. https://doi.org/10.1109/TKDE.2011.181.
[27] A. Krizhevsky, G. E. Hinton, ImageNet Classification with Deep Convolutional Neural Networks, in: Adv. Neural Inf. Process. Syst., 2012: pp. 1097-1105.

What is claimed is:

1. An apparatus for hydrocarbon gas detection and differentiation, the apparatus comprising:

a sensing unit comprising an inlet at an inlet end, a channel in fluid communication with the inlet, and a sensor in fluid communication with the channel, the sensor at an end of the channel opposite the inlet end;

a housing comprising a first housing portion and a second housing portion, the first housing portion configured for receiving therein a linear actuator, the linear actuator operatively coupleable to the sensing unit proximal to the inlet, and the second housing portion for receiving therein at least a portion of the inlet end of the sensing unit and comprising at least one chamber; and a closure member housed within the second housing portion and adjacent the inlet, the closure member actuatable between a closed state and an open state by the linear actuator;

wherein the at least one chamber is in fluid communication with the inlet when the closure member is in the open state.

2. The apparatus of claim 1, wherein the closure member is a magnetic plunger.

3. The apparatus of claim 1, wherein the channel is a microchannel.

4. The apparatus of claim 1, wherein the sensor is a metal oxide semiconducting sensor.

5. The apparatus of claim 1, additionally comprising a mounting flange for operatively coupling the apparatus to a gas-containing system at an end of the second housing portion distal to the first housing portion.

6. The apparatus of claim 5, wherein the gas-containing system is a natural gas pipeline.

7. A system for hydrocarbon gas detection and differentiation, the system comprising:

an apparatus for hydrocarbon gas detection and differentiation, the apparatus comprising:

a sensing unit comprising an inlet at an inlet end, a channel in fluid communication with the inlet, and a sensor in fluid communication with the channel, the sensor at an end of the channel opposite the inlet end;

a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator, wherein the at least one chamber is in fluid communication with the inlet when the closure member is in the open state;

a processor for data collection; and a power source.

8. The system of claim 7, additionally comprising an air-introduction component.

9. The system of claim 7, wherein the closure member is a magnetic plunger.

10. The system of claim 7, wherein the channel is a microchannel.

11. The system of claim 7, wherein the sensor is a metal oxide semiconducting sensor.

12. The system of claim 7, additionally comprising a mounting flange for operatively coupling the apparatus to a gas-containing system at an end of the second housing portion distal to the first housing portion.

13. The system of claim 12, wherein the gas-containing system is a natural gas pipeline.

14. A method of hydrocarbon gas detection and differentiation, the method comprising:

providing hydrocarbon gases to a chamber of an apparatus for hydrocarbon gas detection and differentiation, the apparatus comprising:

a sensing unit comprising an inlet at an inlet end, a channel in fluid communication with the inlet, and a sensor in fluid communication with the channel, the sensor at an end of the channel opposite the inlet end;

a housing comprising a first housing portion and a second housing portion, the first housing portion for receiving a linear actuator, the linear actuator operatively coupleable to the sensing unit proximal to the inlet, and the second housing portion for receiving at least a portion of the inlet end of the sensing unit and comprising at least one chamber; and a closure member housed within the second housing portion and adjacent the inlet, the closure member actuatable between a closed state and an open state by the linear actuator;

collecting baseline data with the closure member in a closed state of a first time interval;

actuating the linear actuator to an extended state, thereby exposing the channel to the hydrocarbon gas for a second time interval;

collecting exposure data during the second time interval; and processing the baseline data and the exposure data.

15. The method according to claim 14, additionally comprising actuating the linear actuator to a retracted state, thereby providing a recovery period for the sensor.

16. The method according to claim 14, wherein the first time interval is between 8 seconds and 12 seconds, and the second time interval is between 30 seconds and 50 seconds.

17. The method according to claim 15, wherein the recovery period is between 140 seconds and 160 seconds.

18. The method of according to claim 14, wherein the step of processing comprises pre-processing the exposure data; extracting features from the exposure data; performing transformations on the extracted features; selecting hyper-parameters; and performing model training and testing.

19. The method of according to claim 14, wherein the step of processing comprises pre-processing the exposure data; extracting features from the exposure data; performing transformations on the extracted features; selecting hyper-parameters; and performing model training and testing.

20. The method according to claim 19, wherein the step of processing comprises employing machine-learning techniques to discover patterns in a time-series response of the sensor when exposed to an unknown target sample.

21. The method according to claim 14, wherein the step of processing provides (i) provides a baseline output and an exposure output for analyses and comparisons thereof, and a summary report for the analyses and comparisons, (ii) determines if there are significant differences between the baseline output and the exposure output and if significant differences are identified, (iii) produces a summary report for the determination, and communicates an alert and the summary report of the identified significant differences to a recipient.

* * * * *